(12) United States Patent
Weathers et al.

(10) Patent No.: US 11,435,730 B2
(45) Date of Patent: Sep. 6, 2022

(54) SYSTEM AND METHOD FOR FORMING AN INTEGRALLY-STIFFENED, CURVED METALLIC PANEL

(71) Applicant: THE BOEING COMPANY, Chicago, IL (US)

(72) Inventors: James B. Weathers, Huntsville, AL (US); Jeffrey W. Weathers, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 19 days.

(21) Appl. No.: 16/892,339

(22) Filed: Jun. 4, 2020

(65) Prior Publication Data

US 2021/0382468 A1 Dec. 9, 2021

(51) Int. Cl.
*G05B 19/418* (2006.01)
*B64G 1/66* (2006.01)

(52) U.S. Cl.
CPC ......... *G05B 19/41885* (2013.01); *B64G 1/66* (2013.01); *G05B 19/4183* (2013.01); *G05B 19/4188* (2013.01)

(58) Field of Classification Search
CPC .......... G05B 19/41885; G05B 19/4183; G05B 19/4188; B64G 1/66
See application file for complete search history.

(56) References Cited

U.S. PATENT DOCUMENTS

| | | | |
|---|---|---|---|
| 5,300,367 A | 4/1994 | Bodart et al. | |
| 6,219,586 B1* | 4/2001 | Sakai | G05B 19/4181 |
| | | | 700/182 |
| 6,353,768 B1* | 3/2002 | Karafillis | G06F 30/23 |
| | | | 700/97 |
| 7,809,454 B2 | 10/2010 | Hu et al. | |
| 2001/0009107 A1* | 7/2001 | Cheng | B21D 22/30 |
| | | | 72/348 |

OTHER PUBLICATIONS

Yu Yan, Hai-bo Wang, Min Wan, "FEM modelling for press bend forming of doubly curved integrally stiffened aircraft panel," Transactions of Nonferrous Metals Society of China, vol. 22, Supplement 1, 2012, pp. s39-s47 (Year: 2012).*
Zhang M, Tian X, Li W, Shi X. An Equivalent Calculation Method for Press-Braking Bending Analysis of Integral Panels. Metals. 2018; 8(5):364. https://doi.org/10.3390/met8050364 (Year: 2018).*
Jing Yang, Design and characterization of an innovative integrally stiffened structure using Additive Manufacturing, Coventry University, MSc Individual Project, Aug. 2015 (Year: 2015).*

(Continued)

*Primary Examiner* — Christopher E. Everett
(74) *Attorney, Agent, or Firm* — The Small Patent Law Group LLC; Joseph M Butscher

(57) ABSTRACT

A system and method include a simulation control unit configured to receive structural data regarding a structure to be formed. The simulation control unit performs a virtual forming simulation to determine a feasibility of forming the structure based on the structural data. In response to the simulation control unit determining that the structure can be feasibly formed based on the structural data, the simulation control unit outputs a forming plan for forming the structure based on the structural data.

20 Claims, 5 Drawing Sheets

(56) References Cited

OTHER PUBLICATIONS

Locatelli, Davide, Sameer B. Mulani, and Rakesh K. Kapania. "Wing-box weight optimization using curvilinear spars and ribs (SpaRibs)." Journal of Aircraft 48, No. 5 (2011): 1671-1684. (Year: 2011).*

Mulani, Sameer B., Wesley CH Slemp, and Rakesh K. Kapania. "EBF3PanelOpt: An optimization framework for curvilinear blade-stiffened panels." Thin-Walled Structures 63 (2013): 13-26. (Year: 2013).*

* cited by examiner

SYSTEM AND METHOD FOR FORMING AN INTEGRALLY-STIFFENED, CURVED METALLIC PANEL

The invention described herein was made in the performance of work under NASA Contract No. NNM07AB03C and is subject to the provisions of Section 305 of the National Aeronautics and Space Act of 1958 (72 Stat. 435: 42 U.S.C.2457.)

FIELD OF THE DISCLOSURE

Embodiments of the subject disclosure generally relate to systems and methods for forming structures having desired shapes, such as integrally-stiffened, curved metallic panels.

BACKGROUND OF THE DISCLOSURE

Various structures are formed through brake or bump forming processes. For example, brake or bump forming processes are used to produce integrally-stiffened, curved metallic panels, which are extensively used in aerospace structures.

Currently, development efforts are required to evaluate sensitivity of the forming process in relation to a configuration (for example, rib spacing/thickness, rib aspect ratio, etc.) and material choices. A typical forming development effort requires the procurement of multiple test panels to evaluate the formability associated with a particular material and specific subset of design parameters. In short, development of integrally-stiffened, curved metallic panels involves substantial trial and error, which is typically necessary to reduce risk associated with panel designs that do not fall well within known forming guidelines and/or a knowledge base.

As can be appreciated, the process of deriving a forming plan through a trial and error process involving numerous materials and design iterations is costly and time-consuming. For example, materials are provided to manufacturers, who then incrementally perform forming operations based on various assumptions. At each stage in such a trial and error process, the manufacturer assesses the feasibility of the forming process. Often, a stage of the trial and error process can result in material failure, at which point the proposed process may be deemed infeasible. Accordingly, the process often generates material waste. Further, in response to a determination that a forming process is not feasible (such as after a test material has been damaged), the development process starts again with new, costly test materials.

SUMMARY OF THE DISCLOSURE

A need exists for an efficient and cost-effective system and method for forming a structure (for example, an integrally-stiffened, curved metallic panel). A need exists for a system and method for forming various structures that reduces costly material waste and development time.

With those needs in mind, certain embodiments of the subject disclosure provide a system including a simulation control unit configured to receive structural data associated with a structure to be formed. The simulation control unit performs a virtual forming simulation to determine the feasibility of forming the structure of interest in accordance with the structural data. In response to the feasibility study based on the simulation control unit out, the simulation control unit outputs a forming plan for forming the structure based on the structural data.

In at least one embodiment, a forming tool includes an operative portion, and a forming control unit. The forming control unit is in communication with the simulation control unit. The forming control unit receives the forming plan from the simulation control unit, and operates the operative portion to form the structure in accordance with the forming plan.

As an example, the operative portion includes a lower portion including two die spaced a certain length apart. For example, a first lower die is spaced apart from a second lower die. The first lower die and the second lower die abut against a first surface of the structure. An upper punch is positioned over and abuts against a second surface of the structure. The second surface is opposite from the first surface.

As an example, the structure is an integrally-stiffened, curved metallic panel.

In at least one embodiment, a structural properties datastore stores physical properties data regarding one or more properties of one or more materials. The simulation control unit is in communication with the structural properties datastore. The simulation control unit performs the virtual forming process by analyzing the structural data in relation to the physical properties data.

As an example, the structural data includes skin thickness of a base panel, rib height for one or more stiffening ribs, spacing between the one or more stiffening ribs, thickness of the one or more stiffening ribs, and a desired radius of curvature.

In at least one embodiment, the simulation control unit performs the virtual forming process including determining a plunge depth for forming the structure. The simulation control unit determines the plunge depth based on at least three contact points that define a circle having a radius equal to a required forming radius to form the structure.

Certain embodiments of the subject disclosure provide a method including receiving, by a simulation control unit, structural data regarding a structure to be formed; performing, by the simulation control unit, a virtual forming process to determine a feasibility of forming the structure based on the structural data; and outputting, in response to the simulation control unit determining that the structure can be feasibly formed based on the structural data, a forming plan for forming the structure based on the structural data.

In at least one embodiment, the method also includes receiving, by a forming control unit in communication with the simulation control unit, the forming plan from the simulation control unit; and operating, by the forming control unit, an operative portion of a forming tool to form the structure based on the forming plan.

Certain embodiments of the subject disclosure provide a non-transitory computer-readable storage medium comprising executable instructions that, in response to execution, cause a system including a processor, to perform operations including receiving, by a simulation control unit, structural data regarding a structure to be formed; performing, by the simulation control unit, a virtual forming process to determine a feasibility of forming the structure based on the structural data; and outputting, in response to the simulation control unit determining that the structure can be feasibly formed based on the structural data, a forming plan for forming the structure based on the structural data.

In at least one embodiment, the non-transitory computer-readable storage further includes operating, by a forming control unit of a forming tool, an operative portion of the forming tool to form the structure based on the forming plan.

DETAILED DESCRIPTION OF THE DISCLOSURE

Figure 1:
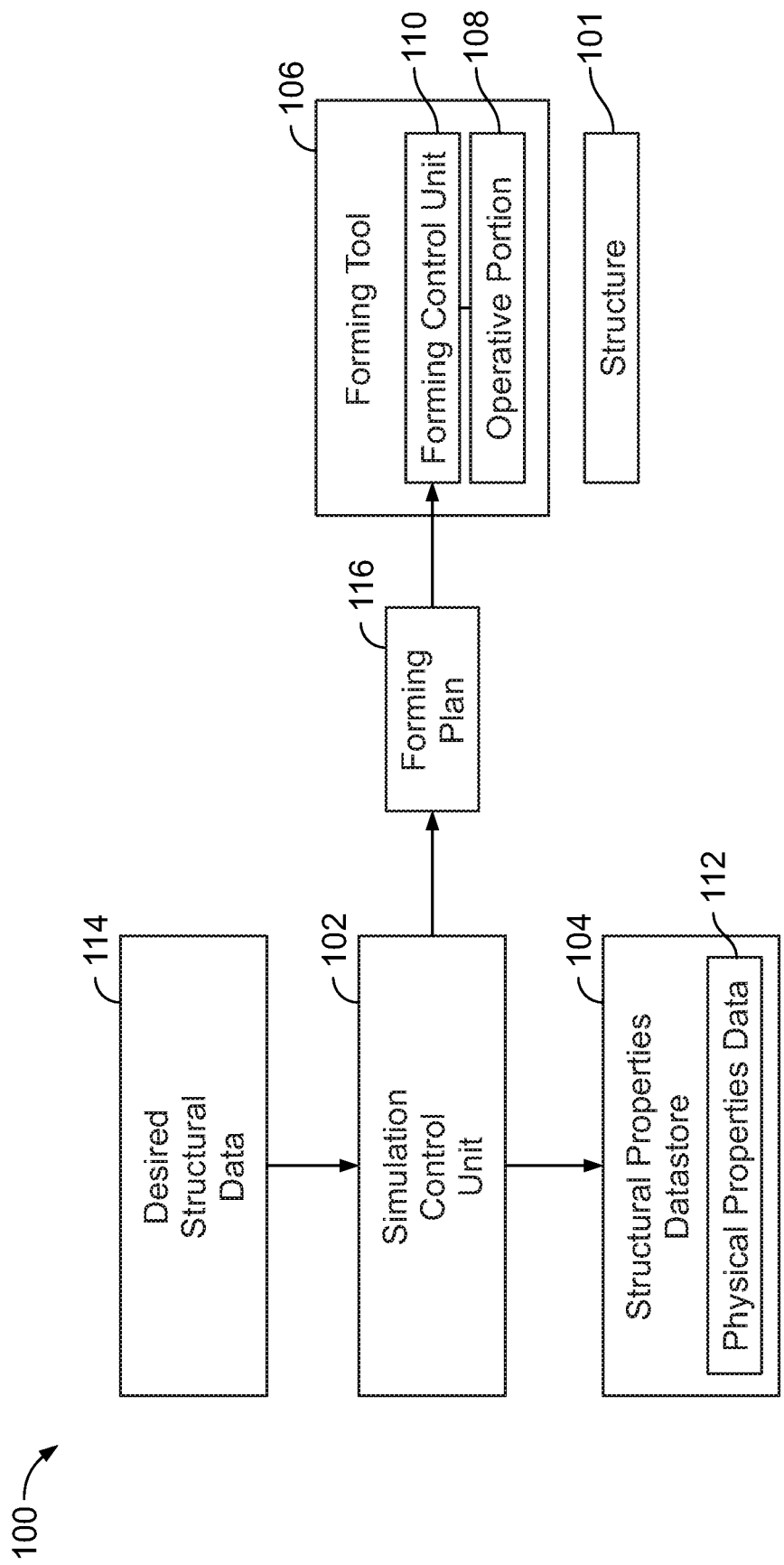
FIG. 1 illustrates a schematic block diagram of a system for forming a structure having a desired shape, according to an embodiment of the subject disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the subject disclosure provide a system and a method for efficiently and cost-effectively forming a structure, such as an integrally-stiffened, curved metallic panel. In at least one embodiment, a simulation control unit is configured to predict geometric and material nonlinear behavior. In at least one embodiment, finite element analysis tools support an analysis methodology developed to accurately predict the reaction of stiffened panels in relation to a forming process. By applying boundary conditions, panel forming is simulated through an implicit direct-integration dynamic analysis where inertia effects are used to manage structural instabilities encountered during a simulation. The simulation results, through analysis iterations, are used to predict a forming radius to achieve a desired, post-formed panel radius. Additionally, a survey of resulting inelastic stresses and strains is used to identify strength and/or stability issues associated with a particular panel design.

Embodiments of the subject disclosure facilitate virtual forming radius predictions, thereby reducing the number of forming iterations used to empirically determine a forming radius for a structure. Mass-optimized panel configurations, without previous strength and/or stability issues, are generated while drastically reducing risk and cost/schedule impacts associated with a typical forming development program. Further, the results of the forming simulations can be used to develop initial forming plans for manufacturers.

Embodiments of the subject disclosure provide a system and method for forming a structure, such as a panel having a desired curvature, which drastically reduce structure forming development costs, optimize structure geometry, and develop forming plans for manufacturers of various structures.

In at least one embodiment, a simulation control unit develops a forming plan for a structure by performing virtual forming simulations. After determining that a forming operation, considering the desired (or otherwise defined) structural data, is feasible for a particular structure, the simulation control unit outputs a forming plan to a forming control unit of a forming tool. Per the forming plan, the forming tool then forms a structure into a desired shape.

Certain embodiments of the subject disclosure provide a system and method that includes a simulation control unit that performs a forming simulation process. Forming development for a structure is performed virtually using panel forming simulations, in contrast to actual, physical trial and error iterations. Embodiments of the subject disclosure provide a significant cost benefit over existing trial and error solutions, in which multiple development articles are used as part of a test program. The system and method according to embodiments of the subject disclosure allow a designer of a structure to fully optimize each panel configuration without a significant cost penalty, as compared to current known solutions. The system and method use simulation results to build an initial forming plan for a particular panel configuration, which reduces supplier workload. Embodiments of the subject disclosure can be used to simulate the production of any brake/bump formed metallic part.

FIG. 1 illustrates a schematic block diagram of a system 100 for forming a structure 101 having a desired shape, according to an embodiment of the subject disclosure. The system 100 includes a simulation control unit 102 in communication with a structural properties datastore or database 104, such as through one or more wired or wireless connections. A forming tool 106 is used to form the structure 101 into the desired shape.

In at least one embodiment, the structure 101 is produced from or otherwise formed of a metal, such as aluminum, or an aluminum alloy. Optionally, the structure 101 can be manufactured from a different parent metal, such as copper, titanium, or the like. As an example, the structure 101 is an integrally-stiffened, curved metallic panel. In at least one embodiment, the structure 101 includes a base panel, such as can be formed of a metal, and one or more stiffening ribs, such as can be formed of the same metal or a different metal, secured to the base panel. In at least one other embodiment, the structure 101 is formed of a non-metal, such as a plastic. In at least one other embodiment, the structure 101 includes metallic and non-metallic components.

The forming tool 106 includes an operative portion 108 that is controlled by a forming control unit 110. In at least one embodiment, the operative portion 108 includes one or more of a forming head, a die, or the like.

The forming control unit 110 is in communication with the simulation control unit 102, such as through one or more wired or wireless connections. In at least one embodiment, the simulation control unit 102 and the forming control unit 110 are co-located. In at least one other embodiment, the simulation control unit 102 and the forming control unit 110 are remotely located from one another.

The structural properties datastore 104 stores physical properties data 112 (that is, data regarding physical and mechanical properties) associated with or otherwise regarding the structure 101. The physical properties data 112 includes data regarding physical properties for the structure 101, such as the base panel and the stiffening ribs. For example, the physical properties data 112 includes information regarding hardness, stiffness, ductility, plasticity, and/or the like.

The structural properties datastore 104 stores the physical properties data (that is, known, actual physical data) regarding one or more properties of one or more materials (such as proposed for use in desired or otherwise defined structural data 114). In at least one embodiment, the simulation control unit 102 performs a virtual forming process (such as a simulation) by analyzing the desired structural data 114 in relation to the physical properties data 112. For example, the simulation control unit 102 performs a simulation by analyzing the desired structural data 114 considering the physical properties data 112 associated with a particular structural article.

In operation, the simulation control unit 102 receives the desired structural data 114 regarding the structure 101 to be formed. For example, the simulation control unit 102 can receive the desired structural data 114 from an input device, such as a computing device, a handheld device (such as a smart phone, smart tablet, etc.), or the like. The desired structural data 114 includes information regarding the material(s) and shape for the structure 101, as desired to be formed. For example, the desired structural data 114 includes various parameters for an integrally-stiffed, curved metallic panel, including skin thickness of the base panel, rib height for the stiffening ribs, spacing between stiffening ribs, thickness of the stiffening ribs, desired radius of curvature, and/or the like.

The simulation control unit 102 analyzes the desired structural data 114 in relation to the physical properties data 112 stored in the structural properties datastore 104. In particular, the simulation control unit 102 performs a virtual forming simulation for the structure 101 based on the desired structural data 114 and the physical properties data 112. The simulation control unit 102 determines the feasibility of forming the structural article based on the desired structural data 114 and the physical properties data 112. If the simulation control unit 102 determines one or more anomalies between the desired structural data 114 and the physical properties data 112, the simulation control unit determines that the structure 101 is unable to be formed. The anomalies includes one or more of cracking, buckling, bending beyond desired thresholds, and/or the like.

If, however, the simulation control unit 102 determines that the desired structural data 114 and the physical properties data 112 are in agreement to lead to a feasible design (that is, the structure 101 can be formed based on (for example, considering) the desired structural data 114), the simulation control unit 102 generates a forming plan based on the desired structural data 114. The simulation control unit 102 then outputs the forming plan 116 to the forming control unit 110. The forming control unit 110 then operates the operative portion 108 of the forming tool 106 to form the structure 101 according to the forming plan 116.

As described herein, the system 100 includes the simulation control unit 102 configured to receive the desired structural data 114 regarding the structure 101 to be formed. The simulation control unit 102 performs a virtual forming process (for example, a virtual forming simulation) to determine the feasibility of forming the structure 101 based on the desired structural data, 114. In response to the simulation control unit 102 determining that the structure 101 can be feasibly formed based on the desired structural data 114, the simulation control unit 102 outputs the forming plan 116 for forming the structure 101 based on the desired structural data 114.

Further, the forming tool 106 includes the operative portion 108, and the forming control unit 110. The forming control unit 110 is in communication with the simulation control unit 102. The forming control unit 110 receives the forming plan 116 from the simulation control unit 102. The forming control unit 110 operates the operative portion 108 to form the structure 101 based on the forming plan 116.

As described herein, embodiments of the subject disclosure provide a method including receiving, by the simulation control unit 102, the desired structural data 114 regarding (for example, associated with) the structure 101 to be formed; performing, by the simulation control unit 102, a virtual forming process to determine a feasibility of forming the structure 101 based on the desired structural data 114; and outputting, in response to the simulation control unit 102 determining that the structure 101 can be feasibly formed based on the desired structural data 114, the forming plan 116 for forming the structure 101 based on the desired structural data.

In at least one embodiment, the method also includes receiving, by the forming control unit 110 in communication with the simulation control unit 102, the forming plan 116 from the simulation control unit 102; and operating, by the forming control unit 110, the operative portion 108 of the forming tool 106 to form the structure 101 based on the forming plan 116.

Figure 2:
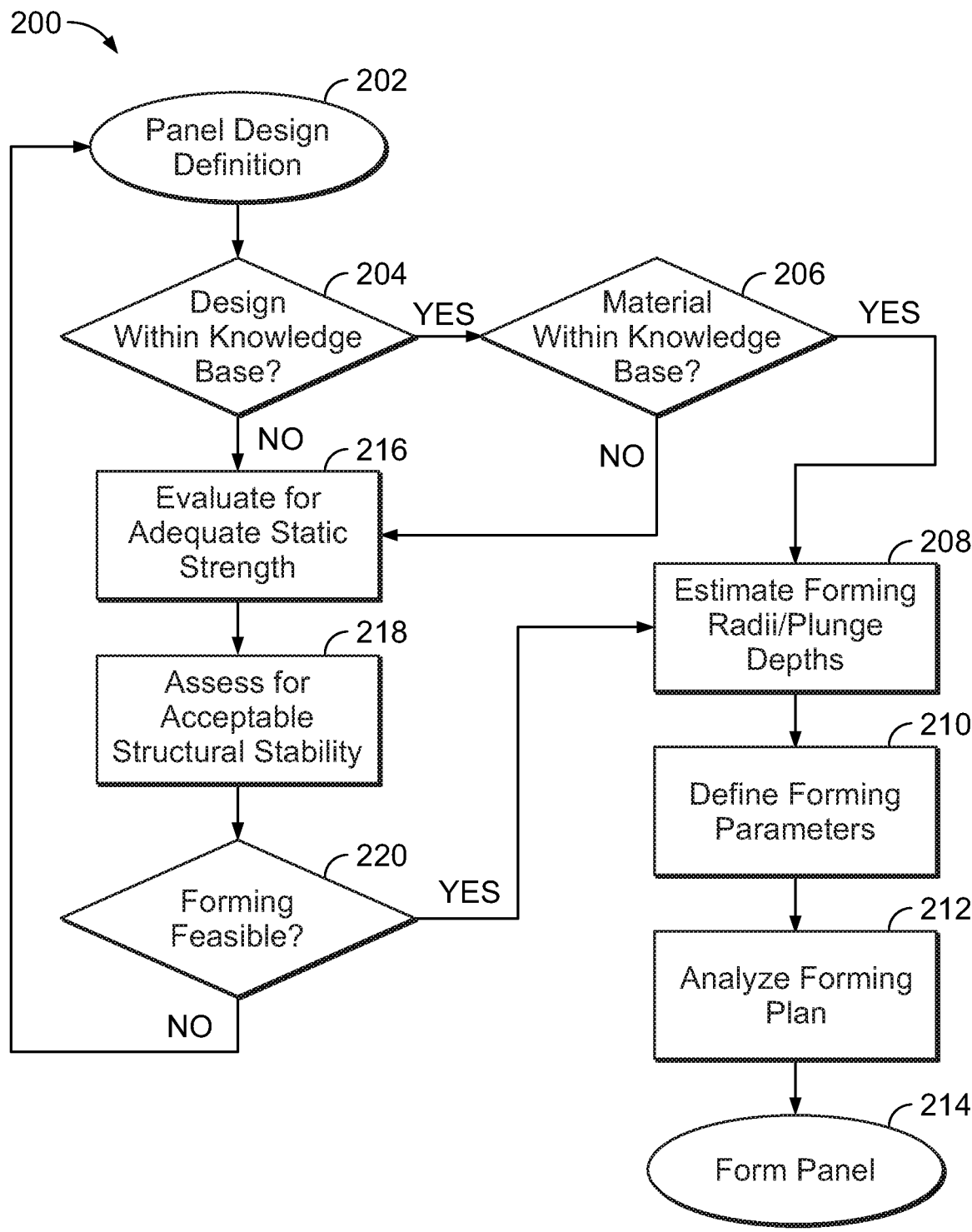
FIG. 2 illustrates a flow chart of a method for forming a structure having a desired shape, according to an embodiment of the subject disclosure.

FIG. 2 illustrates a flow chart of a method 200 for forming a structure having a desired shape, according to an embodiment of the subject disclosure. Referring to FIGS. 1 and 2, the simulation control unit 102 receives a panel design definition 202. In at least one embodiment, the desired structural data 114 includes the panel design definition 202. The panel design definition 202 includes parameters for a panel, such as an integrally-stiffened, curved metallic panel, which is an example, of the structure 101. In at least one embodiment, the panel design definition 202 includes skin thickness of a base panel, height of one or more stiffening ribs, spacing between the stiffening ribs, thickness of the stiffening ribs, a desired radius of curvature for the panel, and/or the like.

At 204, the simulation control unit 102 determines if the panel design definition 202 is within a knowledge base. For example, in at least one embodiment, physical properties data 112 within the structural properties datastore 104 includes the panel design definition 202, such as may be used previously to form the structure 101.

If the panel design definition 202 is within the knowledge base at 204, the method proceeds to 206, at which the simulation control unit 102 determines if the material (that is, the desired material for the structure 101) is within the knowledge base. For example, in at least one embodiment, the physical properties data 112 within the structural properties datastore 104 includes the material for the structure 101, such as may have been used previously to form the structure 101.

If the panel design definition 202 is within the knowledge base at 204, and the material is within the knowledge base at 206, the simulation control unit 102 can bypass a virtual forming simulation, and output a forming plan 116 based on the panel design definition 202 and the desired material, as such were previously determined to be feasible to form the structure 101. For example, the forming plan 116 that is output to the forming control unit 110 of the forming tool 106 estimates forming radii and plunge depths at 208 and defines forming parameters at 210. At 212, the forming control unit analyzes the forming plan, and at 214 operates according to the forming plan to form the structure 101 (such as a panel) according to the forming plan.

If, however, the panel design definition 202 is not within the knowledge base at 204 and/or the material is not within the knowledge base at 206, the method proceeds from 204 and/or 206 to 216, at which the simulation control unit 102 evaluates the panel design definition 202 and/or the material for adequate static strength. For example, various dimensions, shapes, and/or the like for the structure 101 are in the desired structural data 114 (for example, the panel design definition 202). Data regarding stress and strain relationships for the material(s) of the structure 101 are included in the physical properties data 112 stored in the structural properties datastore 104. The simulation control unit 102 performs a virtual forming simulation to determine if the panel design definition 202 and the material are able to withstand forming forces, as exerted by the forming tool 106, based on static strength data, including stress and strain relationships, as included in the physical properties data 112.

Further, at 218, the simulation control unit 102 assesses the panel design definition 202 and the material for acceptable structural stability. Again, data regarding the structural stability, such as how the materials react during a forming process, are included in the physical properties data 112. As an example, the data regarding the structural stability includes information in relation to how the stiffening ribs react during a forming process, such as whether the stiffening ribs buckle or become wavy during a forming process.

At 220, the simulation control unit 102 determines if a proposed forming process, based on the panel design definition 202 and the proposed material, is feasible. The determination regarding feasibility is based on the evaluation at 216 as to whether there is adequate static strength, and assessment at 218 as to whether there is acceptable structural stability. If the proposed forming process is determined to be feasible at 220, the method proceeds to 208, as described above.

If, however, the proposed forming process is determined not to be feasible at 220, the simulation control unit 102 determines that the proposed panel design definition and material are not able to be used to form the structure 101, and the method returns to 202, which includes a different proposed design definition and/or material.

Accordingly, instead of iteratively forming test structures to determine if the structure 101 can be formed through costly, time-consuming trial and error processes, the simulation control unit 102 performs a single virtual design simulation that analyzes the desired structural data 114 in relation to the physical properties data 112 to determine if the structure 101 can be formed based on the desired structural data 114. In this manner, the system and method according to embodiments of the subject disclosure eliminate, minimize, or otherwise reduce material waste, and significantly reduce the time and cost of the development process, as there is no need for costly trial and error physical test operations on test materials.

Figure 3:
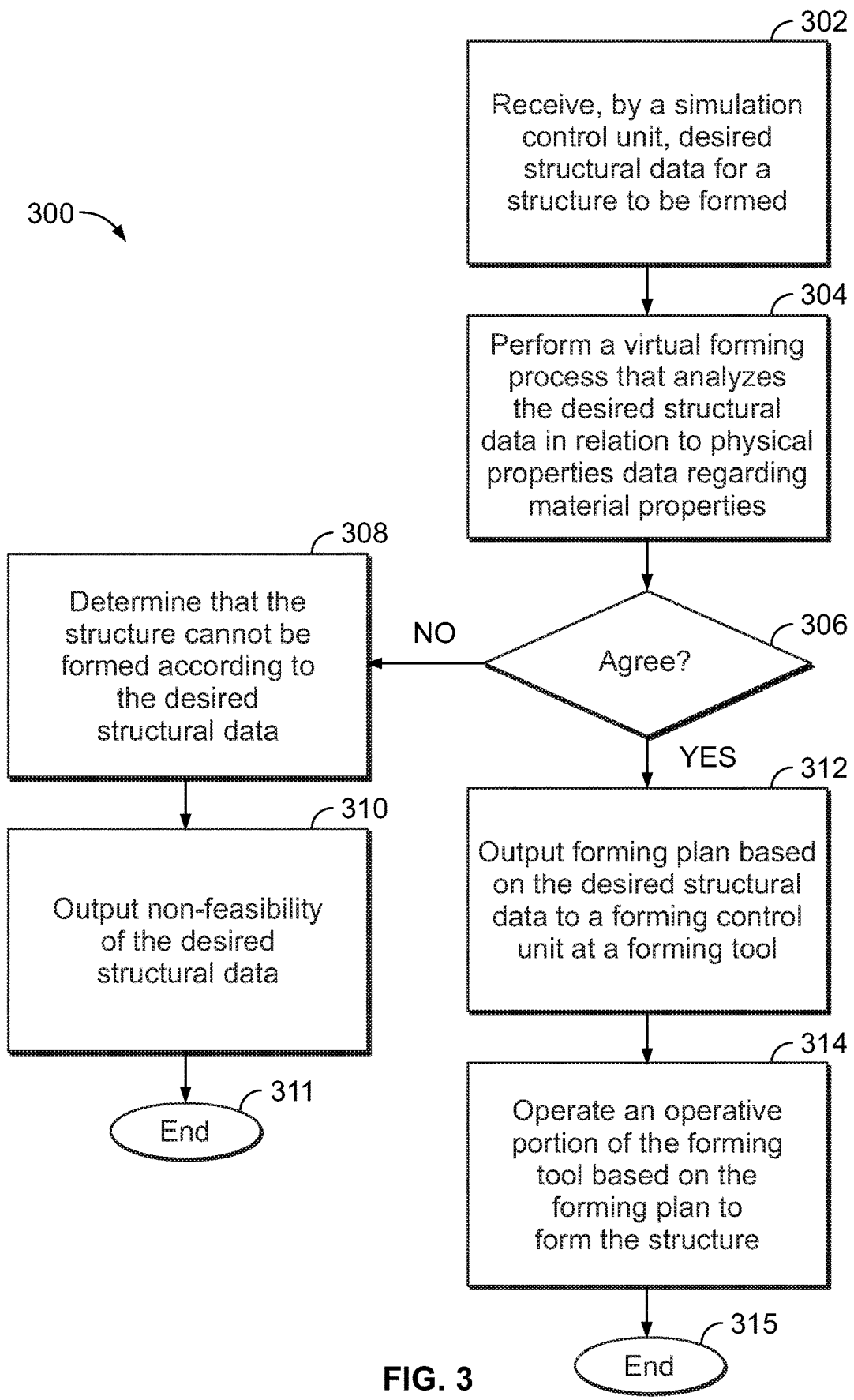
FIG. 3 illustrates a flow chart of a method for forming a structure having a desired shape, according to an embodiment of the subject disclosure.

FIG. 3 illustrates a flow chart of a method 300 for forming a structure having a desired shape, according to an embodiment of the subject disclosure. Referring to FIGS. 1 and 3, at 302, the simulation control unit 102 receives the desired structural data 114 for the structure 101 to be formed.

At 304, the simulation control unit 102 performs a virtual forming process (for example, a virtual forming simulation) that analyzes (for example, assesses, studies, or the like) the desired structural data 114 in relation to the physical properties data 112 regarding material properties (for the material(s) as set forth in the desired structural data 114) stored in the structural properties datastore 104. For example, the simulation control unit 102 determines the forces (such as stresses and strains) exerted into or otherwise developed in the material(s) during the forming process (based on the desired structural data 114). Further, the simulation control unit 102 uses the simulation results (based on the desired structural data 114) to determine whether the material(s) are able to withstand the forces generated in the forming process and maintain a desired size and shape, as set forth in the desired structural data 114.

In at least one embodiment, at 306, the simulation control unit 102 determines if the desired structural data 114 agrees with the physical properties data 112. That is, the simulation control unit 102 determines if the structure 101 can feasibly be formed having properties as set forth in the desired structural data 114 based on physical properties of the materials to be used, and whether such materials can withstand forming forces, such as can be included in the physical properties data 112.

If the desired structural data 114 does not agree with the physical properties data 112 at 306 (for example, the desired structural data 114 along with the physical properties data 112 does not result in a feasible design based on simulation control outputs), the simulation control unit 102 determines that the structure 101 cannot be formed according to the desired structural data 114 at 308. The simulation control unit 102 then outputs a non-feasibility signal indicating non-feasibility of the desired structural data 114, such as to a device (such as a computer, handheld smart device, and/or the like) of an operator. In at least one embodiment, the non-feasibility signal also includes one or more recommendations regarding one or more modifications of the desired structural data 114 that would make it feasible. The method may then end at 311.

If, however, the desired structural data 114 does agree with the physical properties data 112 at 306 (for example, the analysis performed using the simulation control unit 102 shows that the design is feasible based on the desired structural data 114 and the physical properties data 112), the method proceeds to 312, at which time the simulation control unit 102 outputs the forming plan 116 based on the desired structural data 114 to the forming control unit 110 of the forming tool 106. At 314, the forming control unit 110 operates the operative portion 108 of the forming tool 106 based on the forming plan 116 to form the structure 101. The method then ends at 315.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the simulation control unit 102 and the forming control unit 110 can be or include one or more processors that are configured to control operation thereof, as described herein.

The simulation control unit 102 and the forming control unit 110 are configured to execute a set of instructions that are stored in one or more data storage units or elements (such as one or more memories), in order to process data. For example, the simulation control unit 102 and the forming control unit 110 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the simulation control unit 102 and the forming control unit 110 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein can illustrate one or more control or processing units, such as the simulation control unit 102 and the forming control unit 110. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the simulation control unit 102 and the forming control unit 110 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one embodiment, components of the system 100, such as the simulation control unit 102, provide and/or enable a computer system to operate as a special computer system for determining whether or not the structure 101 can be formed according to the desired structural data 114.

Figure 4:
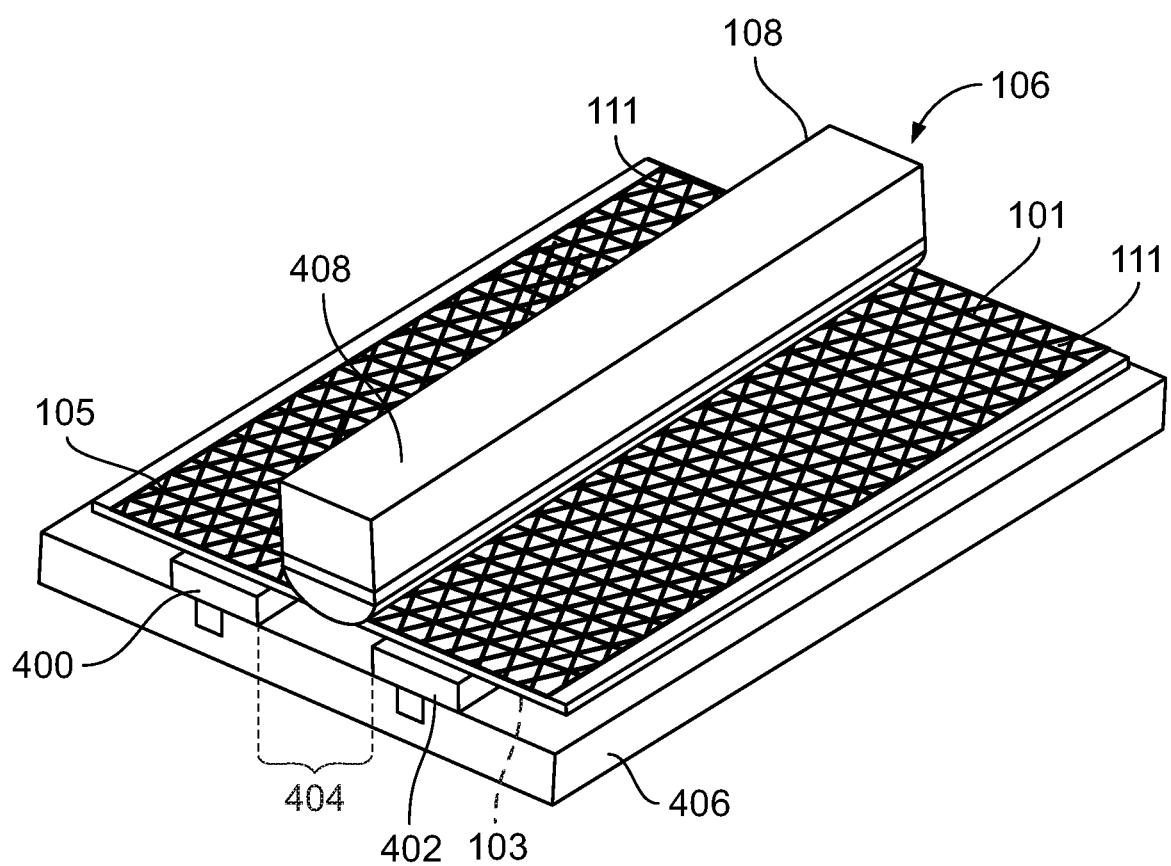
FIG. 4 illustrates a perspective top view of a structure in relation to a forming tool, according to an embodiment of the subject disclosure.

FIG. 4 illustrates a perspective top view of the structure 101 in relation to the forming tool 106, according to an embodiment of the subject disclosure. As an example, the structure 101 is a metal panel, such as an aluminum panel, which can includes a plurality of stiffening members 111, such as stiffening ribs. In at least one embodiment, the operative portion 108 of the forming tool 106 includes a first lower die 400 spaced apart from a second lower die 402 by a distance 404. The first lower die 400 and the second lower die 402 are supported on a base 406. The first lower die 400 and the second lower die 402 abut against a first surface 103 (such as a lower surface) of the structure 101. An upper punch 408 is positioned over and abuts against a second surface 105 (such as an upper surface) of the structure 101. The second surface 105 is opposite from the first surface 103.

Referring to FIGS. 1 and 4, the forming control unit 110 operates the upper punch 408 and/or the first lower die 400 and the second lower die 402 in a brake or bump forming operation to form a curvature in the structure 101. The forming plan 116 includes plunge depths that are configuration dependent.

Figure 5:
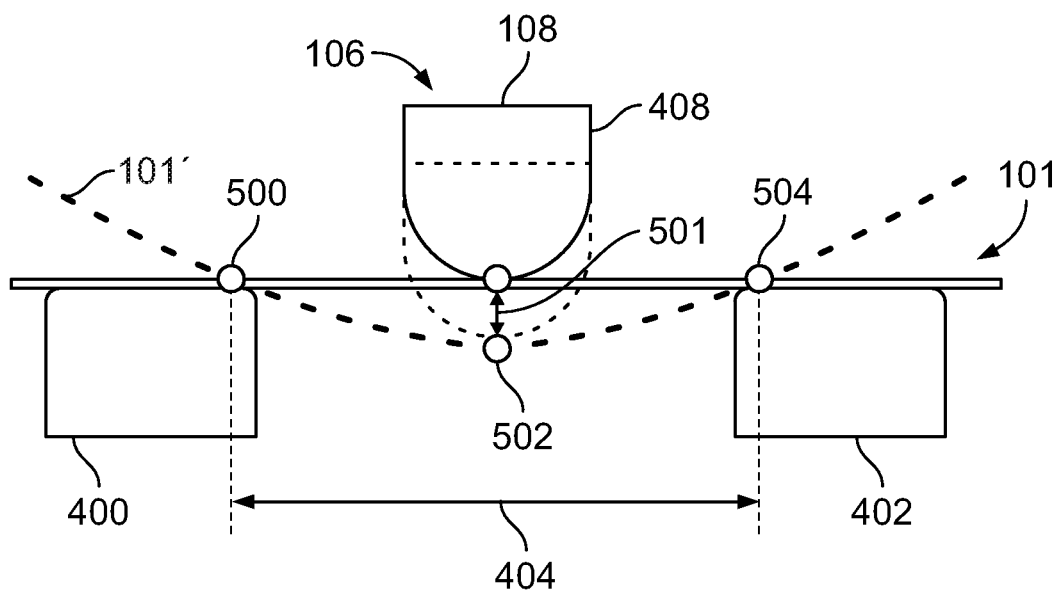
FIG. 5 illustrates a simplified end view of the structure in relation to the forming tool of FIG. 4.

FIG. 5 illustrates a simplified end view of the structure 101 in relation to the forming tool 106 of FIG. 4. Referring to FIGS. 1, 4, and 5, the plunge depth 501 is defined based on a first contact point 500, a second contain point 502, and a third contact point 504 that define a circle having a radius equal to a required forming radius, in order to form a structure 101' having a desired curvature. As described herein, the simulation control unit 102 determines the plunge depth 501 for forming the structure 101' based on virtual simulations performing using the simulation control unit 102.

Figure 6:
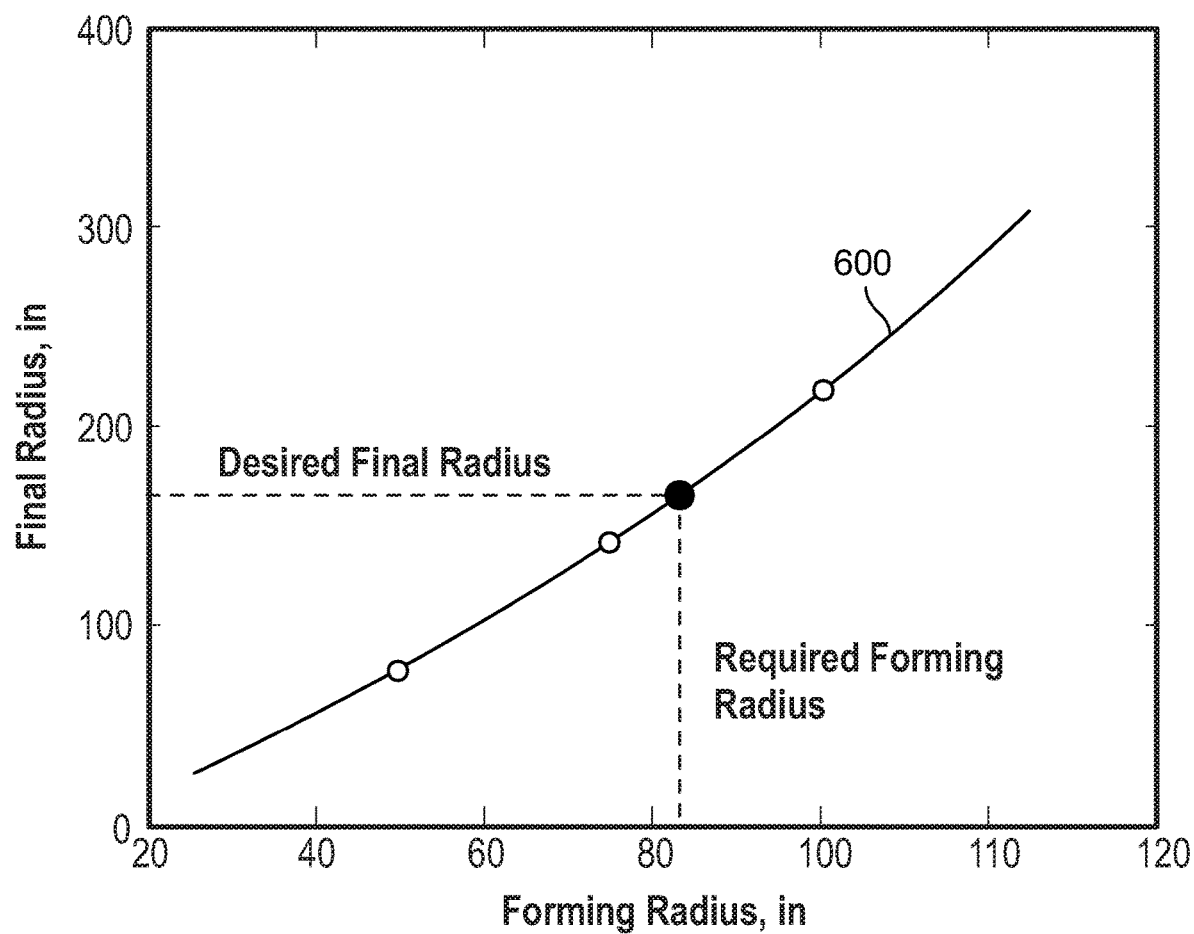
FIG. 6 illustrates a graph of a forming radius in relation to a final radius, according to an embodiment of the subject disclosure.

FIG. 6 illustrates a graph of a forming radius in relation to a final radius, according to an embodiment of the subject disclosure. Referring to FIGS. 1 and 6, the desired final radius for a structure 101 is an example of information stored in the desired structural data 114. The required forming radius is an example of information output by the simulation control unit 102.

In at least one embodiment, during a virtual simulation of a forming process, the simulation control unit 102 performs, operates according to, or otherwise includes a finite element analysis with geometric and material nonlinearity. The simulation control unit 102 applies an enforced displacement step to simulate the bump forming process (such as to impart a plastic deformation into a panel). The simulation control unit 102 executes a spring-back step (that is, releases the enforced displacement applied in the previous step), and records the forming radius in relation to a final radius (that is, after spring back). The simulation control unit 102 repeats these steps for various forming radii. The simulation control unit 102 can then fit data and create a forming curve 600, as shown in FIG. 6. Accordingly, the simulation control unit 102 is able to derive a required forming radius for a particular desired forming radius (such as to overcome the effects of spring-back). The forming curve 600 can be used in the development of the forming plan 116, which can be used by a manufacturer of the structure 101.

Referring to FIGS. 1-6, embodiments of the subject disclosure provide systems and methods for efficiently and cost-effectively forming lightweight, compression carrying cylindrical and conical structure, such as may be used to form portions of aeronautical and aerospace vehicles and components thereof. Nominal stress and strain data is used, such as by the simulation control unit 102, to determine material behavior during a virtual forming simulation. Results of the virtual forming simulation are evaluated by the simulation control unit 102 to ensure structural integrity and that tolerance requirements are met (for example, strains do not exceed instability thresholds). The simulation control unit 102 can validate results of the virtual forming simulation against results from multiple panel development articles.

Further, the disclosure comprises embodiments according to the following clauses:

Clause 1. A system comprising:

a simulation control unit configured to receive desired structural data regarding a structure to be formed, wherein the simulation control unit performs a virtual forming simulation to determine a feasibility of forming the structure based on the desired structural data, and wherein, in response to the simulation control unit determining that the structure can be feasibly formed based on the desired structural data, the simulation control unit outputs a forming plan for forming the structure based on the desired structural data.

Clause 2. The system of Clause 2, further comprising a forming tool comprising:

an operative portion; and a forming control unit, wherein the forming control unit is in communication with the simulation control unit, wherein the forming control unit receives the forming plan from the simulation control unit, and wherein the forming control unit operates the operative portion to form the structure based on the forming plan.

Clause 3. The system of Clauses 1 or 2, wherein the operative portion comprises:

a first lower die spaced apart from a second lower die, wherein the first lower die and the second lower die abut against a first surface of the structure; and an upper punch positioned over and abuts against a second surface of the structure, wherein the second surface is opposite from the first surface.

Clause 4. The system of any of Clauses 1-3, wherein the structure is an integrally-stiffened, curved metallic panel.

Clause 5. The system of any of Clauses 1-4, further comprising a structural properties datastore that stores physical properties data regarding one or more properties of one or more materials, wherein the simulation control unit is in communication with the structural properties datastore, and wherein the simulation control unit performs the virtual forming process by analyzing the desired structural data in relation to the physical properties data.

Clause 6. The system of any of Clauses 1-5, wherein the desired structural data comprises at least one of a skin thickness of a base panel, a rib height for one or more stiffening ribs, a spacing between the one or more stiffening ribs, a thickness of the one or more stiffening ribs, and/or a desired radius of curvature.

Clause 7. The system of any of Clauses 1-6, wherein the simulation control unit performs the virtual forming simulation including determining a plunge depth for forming the structure, and wherein the simulation control unit determines the plunge depth based on at least three contact points that define a circle having a radius equal to a required forming radius to form the structure.

Clause 8. A method comprising:

receiving, by a simulation control unit, desired structural data regarding a structure to be formed;

performing, by the simulation control unit, a virtual forming simulation to determine a feasibility of forming the structure based on the desired structural data; and outputting, in response to the simulation control unit determining that the structure can be feasibly formed based on the desired structural data, a forming plan for forming the structure based on the desired structural data.

Clause 9. The method of Clause 8, further comprising:

receiving, by a forming control unit in communication with the simulation control unit, the forming plan from the simulation control unit; and operating, by the forming control unit, an operative portion of a forming tool to form the structure based on the forming plan.

Clause 10. The method of Clauses 8 or 9, wherein the operative portion comprises:

a first lower die spaced apart from a second lower die, wherein the first lower die and the second lower die abut against a first surface of the structure; and an upper punch positioned over and abuts against a second surface of the structure, wherein the second surface is opposite from the first surface.

Clause 11. The method of any of Clauses 8-10, wherein the structure is an integrally-stiffened, curved metallic panel.

Clause 12. The method of any of Clauses 8-11, further comprising storing, in a structural properties datastore in communication with the simulation control unit, physical properties data regarding one or more properties of one or more materials, wherein said performing comprises analyzing the desired structural data in relation to the physical properties data.

Clause 13. The method of any of Clauses 8-12, wherein the desired structural data comprises at least one of a skin thickness of a base panel, a rib height for one or more stiffening ribs, a spacing between the one or more stiffening ribs, a thickness of the one or more stiffening ribs, and/or a desired radius of curvature.

Clause 14. The method of any of Clauses 8-13, wherein said performing comprises determining a plunge depth for forming the structure, and wherein said determining comprises determining the plunge depth based on at least three contact points that define a circle having a radius equal to a required forming radius to form the structure.

Clause 15. A non-transitory computer-readable storage medium comprising executable instructions that, in response to execution, cause a system comprising a processor, to perform operations comprising:

receiving, by a simulation control unit, desired structural data regarding a structure to be formed;

performing, by the simulation control unit, a virtual forming simulation to determine a feasibility of forming the structure based on the desired structural data; and outputting, in response to the simulation control unit determining that the structure can be feasibly formed based on the desired structural data, a forming plan for forming the structure based on the desired structural data.

Clause 16. The non-transitory computer-readable storage of Clause 15, further comprising facilitating an operative portion of the forming tool to form the structure based on the forming plan.

Clause 17. The non-transitory computer-readable storage of Clauses 15 or 16, further comprising:

determining, by the simulation control unit, one or more anomalies between the structural data and the physical properties data; and determining, by the simulation control unit, that the structure is unable to be formed due to the one or more anomalies.

Clause 18. The non-transitory computer-readable storage of any of Clauses 15-17, wherein the structure is an integrally-stiffened, curved metallic panel.

Clause 19. The non-transitory computer-readable storage of any of Clauses 15-18, further comprising storing, in a structural properties datastore in communication with the simulation control unit, physical properties data regarding one or more properties of one or more materials, wherein said performing comprises analyzing the desired structural data in relation to the physical properties data.

Clause 20. The non-transitory computer-readable storage of any of Clauses 15-19, wherein said performing comprises determining a plunge depth for forming the structure, and wherein said determining comprises determining the plunge depth based on at least three contact points that define a circle having a radius equal to a required forming radius to form the structure.

As described herein, embodiments of the subject disclosure provide efficient and cost-effective systems and methods for forming a structure, such as an integrally-stiffened, curved metallic panel. Embodiments of the subject disclosure provide systems and methods for forming various structures that reduce material waste and development time.

While various spatial and directional terms, such as top, bottom, lower, mid, lateral, horizontal, vertical, front and the like can be used to describe embodiments of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a forming tool comprising an operative portion, and a forming control unit, wherein the operative portion comprises one or more dies and one or more punches; and
a simulation control unit configured to receive structural data regarding a structure to be formed, wherein the structure includes an integrally-stiffened, curved metallic panel, wherein the structural data comprises a skin thickness of a base panel, a rib height for stiffening ribs, a spacing between the stiffening ribs, a thickness of the stiffening ribs, and a desired radius of curvature, wherein the thickness of the stiffening ribs is the same,
wherein the simulation control unit performs a virtual forming simulation to determine a feasibility of forming the structure based on the structural data,
wherein, in response to the simulation control unit determining that the structure can be feasibly formed based on the structural data, the simulation control unit outputs a forming plan for forming the structure based on the structural data; and
wherein the forming control unit is in communication with the simulation control unit, wherein the forming control unit receives the forming plan from the simulation control unit, and wherein the forming control unit operates the operative portion to form the structure based on the forming plan.

2. The system of claim 1, wherein the operative portion comprises:
a first lower die spaced apart from a second lower die, wherein the first lower die and the second lower die abut against a first surface of the structure; and
an upper punch positioned over and abuts against a second surface of the structure, wherein the second surface is opposite from the first surface.

3. The system of claim 1, further comprising a structural properties datastore that stores physical properties data regarding one or more properties of one or more materials, wherein the simulation control unit is in communication with the structural properties datastore, and wherein the simulation control unit performs the virtual forming process by analyzing the structural data in relation to the physical properties data.

4. The system of claim 1, wherein the simulation control unit performs the virtual forming simulation including determining a plunge depth for forming the structure, and wherein the simulation control unit determines the plunge depth based on at least three contact points that define a circle having a radius equal to a required forming radius to form the structure.

5. The system of claim 1, wherein the simulation control unit performs the virtual forming simulation by applying an enforced displacement step to simulate a bump forming process.

6. The system of claim 5, wherein the simulation control unit further performs the virtual forming simulation by executing a spring-back step.

7. The system of claim 6, wherein the simulation control unit further performs the virtual forming simulation by recording a forming radius in relation to a final radius after the spring-back step.

8. A method comprising:
   receiving, by a simulation control unit, structural data regarding a structure to be formed, wherein the structure includes an integrally-stiffened, curved metallic panel, wherein the structural data comprises a skin thickness of a base panel, a rib height for stiffening ribs, a spacing between the stiffening ribs, a thickness of the stiffening ribs, and a desired radius of curvature, wherein the thickness of the stiffening ribs is the same;
   performing, by the simulation control unit, a virtual forming simulation to determine a feasibility of forming the structure based on the structural data;
   outputting, in response to the simulation control unit determining that the structure can be feasibly formed based on the structural data, a forming plan for forming the structure based on the structural data;
   receiving, by a forming control unit in communication with the simulation control unit, the forming plan from the simulation control unit and
   operating, by the forming control unit, an operative portion of a forming tool to form the structure based on the forming plan, wherein the operative portion comprises one or more dies and one or more punches.

9. The method of claim 8, wherein the operative portion comprises:
   a first lower die spaced apart from a second lower die, wherein the first lower die and the second lower die abut against a first surface of the structure; and
   an upper punch positioned over and abuts against a second surface of the structure, wherein the second surface is opposite from the first surface.

10. The method of claim 8, further comprising storing, in a structural properties datastore in communication with the simulation control unit, physical properties data regarding one or more properties of one or more materials, wherein said performing comprises analyzing the structural data in relation to the physical properties data.

11. The method of claim 8, wherein said performing comprises determining a plunge depth for forming the structure, and wherein said determining comprises determining the plunge depth based on at least three contact points that define a circle having a radius equal to a required forming radius to form the structure.

12. The method of claim 8, wherein said performing comprises:
   applying an enforced displacement step to simulate a bump forming process.

13. The method of claim 12, wherein said performing further comprises executing a spring-back step.

14. The method of claim 13, wherein said performing further comprises recording a forming radius in relation to a final radius after said executing.

15. A non-transitory computer-readable storage medium comprising executable instructions that, in response to execution, cause a system comprising a processor, to perform operations comprising:
   receiving, by a simulation control unit, structural data regarding a structure to be formed, wherein the structure includes an integrally-stiffened, curved metallic panel, wherein the structural data comprises a skin thickness of a base panel, a rib height for stiffening ribs, a spacing between the stiffening ribs, a thickness of the stiffening ribs, and a desired radius of curvature, wherein the thickness of the stiffening ribs is the same;
   performing, by the simulation control unit, a virtual forming simulation to determine a feasibility of forming the structure based on the structural data;
   outputting, in response to the simulation control unit determining that the structure can be feasibly formed based on the structural data, a forming plan for forming the structure based on the structural data;
   receiving, by a forming control unit in communication with the simulation control unit, the forming plan from the simulation control unit and
   operating, by the forming control unit, an operative portion of a forming tool to form the structure based on the forming plan, wherein the operative portion comprises one or more dies and one or more punches.

16. The non-transitory computer-readable storage of claim 15, further comprising:
   determining, by the simulation control unit, one or more anomalies between the structural data and the physical properties data; and
   determining, by the simulation control unit, that the structure is unable to be formed due to the one or more anomalies.

17. The non-transitory computer-readable storage of claim 15, further comprising storing, in a structural properties datastore in communication with the simulation control unit, physical properties data regarding one or more properties of one or more materials, wherein said performing comprises analyzing the structural data in relation to the physical properties data.

18. The non-transitory computer-readable storage of claim 15, wherein said performing comprises determining a plunge depth for forming the structure, and wherein said determining comprises determining the plunge depth based on at least three contact points that define a circle having a radius equal to a required forming radius to form the structure.

19. The non-transitory computer-readable storage of claim 15, wherein said performing comprises applying an enforced displacement step to simulate a bump forming process.

20. The non-transitory computer-readable storage of claim 19, wherein said performing further comprises:
   executing a spring-back step; and
   recording a forming radius in relation to a final radius after said executing.

* * * * *